US010277076B2

(12) United States Patent
Nakano et al.

(10) Patent No.: US 10,277,076 B2
(45) Date of Patent: Apr. 30, 2019

(54) POWER RECEIVING UNIT, POWER RECEIVING METHOD, AND FEED SYSTEM

(71) Applicant: SONY CORPORATION, Tokyo (JP)

(72) Inventors: Hiroaki Nakano, Tokyo (JP); Uichiro Omae, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/564,225

(22) PCT Filed: Mar. 30, 2016

(86) PCT No.: PCT/JP2016/060316
§ 371 (c)(1),
(2) Date: Oct. 4, 2017

(87) PCT Pub. No.: WO2016/167123
PCT Pub. Date: Oct. 20, 2016

(65) Prior Publication Data
US 2018/0131231 A1 May 10, 2018

(30) Foreign Application Priority Data
Apr. 15, 2015 (JP) .................................. 2015-083178

(51) Int. Cl.
*H02J 50/12* (2016.01)
*H02J 7/00* (2006.01)
*H02J 50/80* (2016.01)
*H02J 7/02* (2016.01)

(52) U.S. Cl.
CPC .............. *H02J 50/12* (2016.02); *H02J 7/00* (2013.01); *H02J 7/025* (2013.01); *H02J 50/80* (2016.02); *Y02E 70/40* (2013.01)

(58) Field of Classification Search
CPC ... H02J 50/12; H02J 50/80; H02J 7/00; Y02E 70/40
See application file for complete search history.

(56) References Cited

U.S. PATENT DOCUMENTS

2012/0170337 A1   7/2012  Lisi et al.

FOREIGN PATENT DOCUMENTS

| JP | 2000-278887 | A |   | 10/2000 |
|----|-------------|---|---|---------|
| JP | 2008-199857 | A |   | 8/2008  |
| JP | 2008199857  | A | * | 8/2008  |
| JP | 2010-284058 | A |   | 12/2010 |

OTHER PUBLICATIONS

International Search Report and Written Opinion of PCT Application No. PCT/JP2016/060316, dated Jun. 14, 2016, 07 pages of ISRWO.

\* cited by examiner

*Primary Examiner* — Robert Deberadinis
(74) *Attorney, Agent, or Firm* — Chip Law Group

(57) ABSTRACT

A power receiving unit of the disclosure includes a communicator that communicates with a feed unit, a power receiver that has a first rectifier circuit and a second rectifier circuit that each rectify an electric power signal supplied from the feed unit, and a controller that selects and operates one of the first rectifier circuit and the second rectifier circuit.

17 Claims, 11 Drawing Sheets

[ FIG. 1 ]
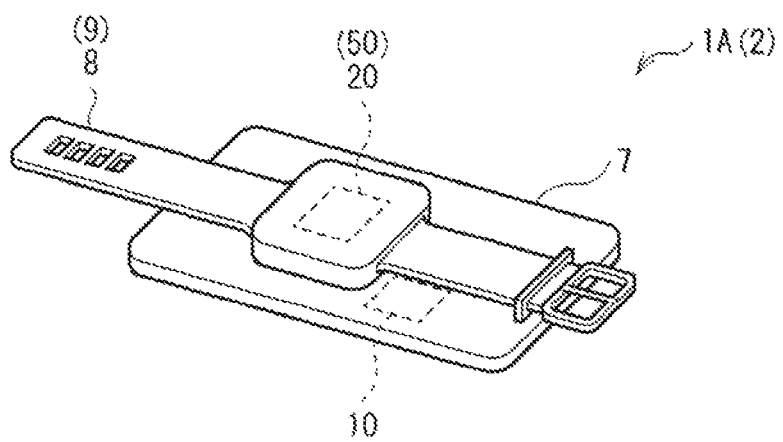

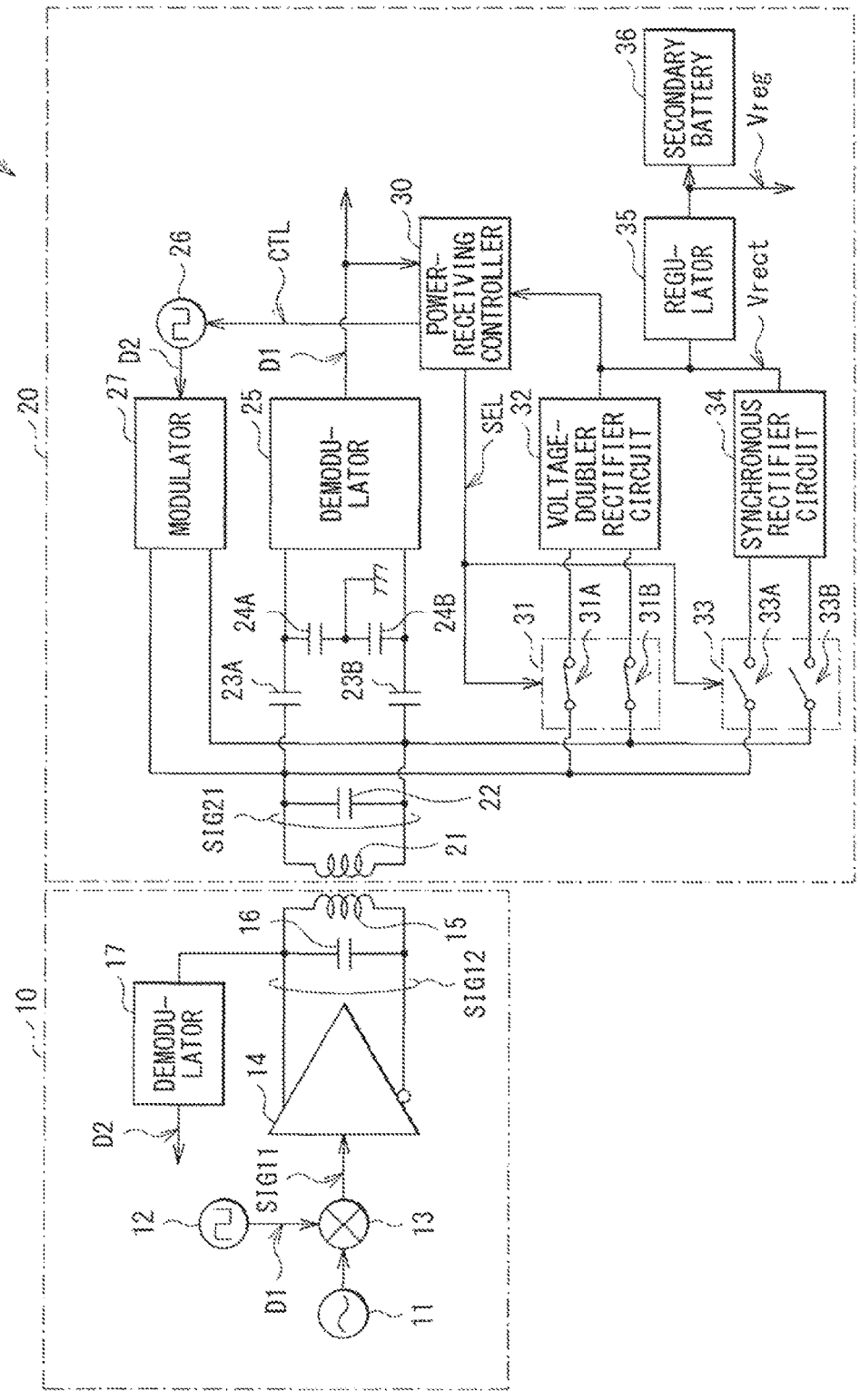
[FIG. 2]

[FIG. 3]
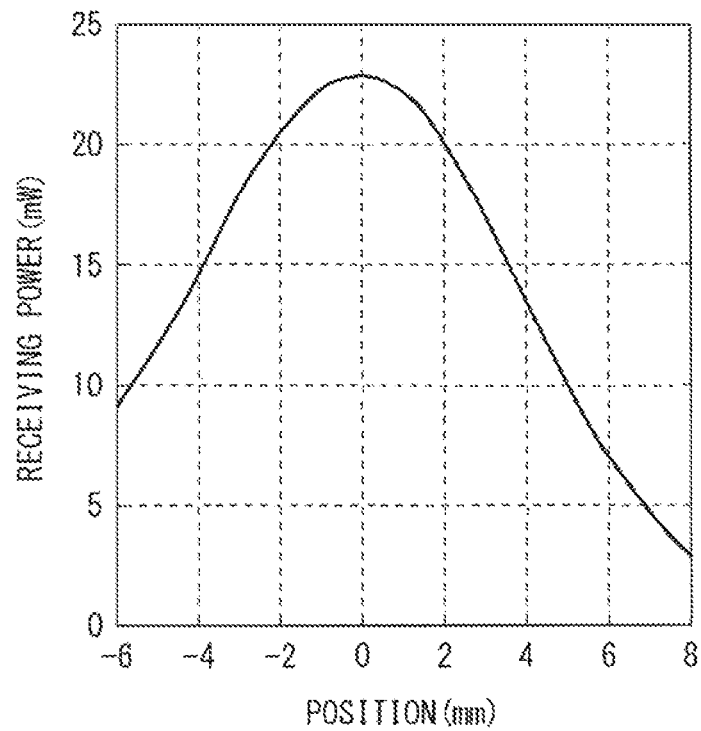
[FIG. 4]
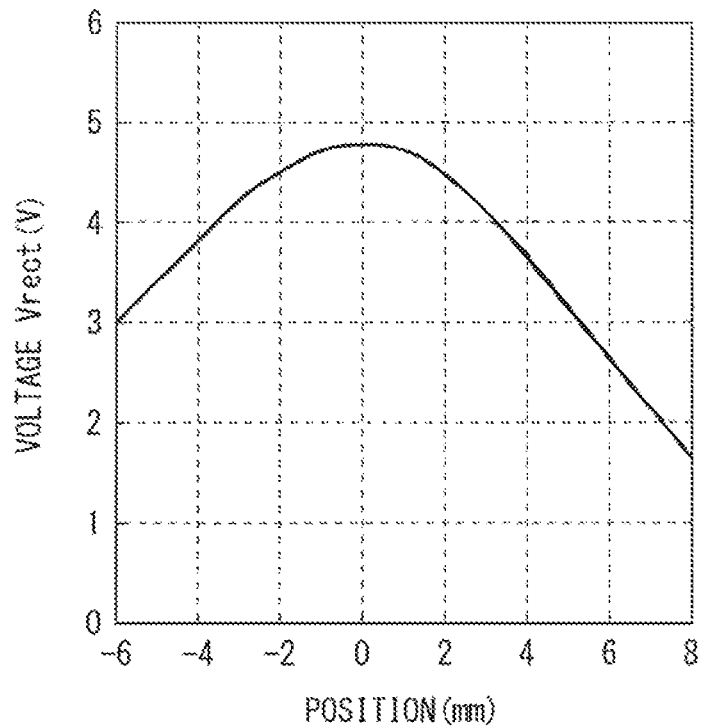

[FIG. 5]
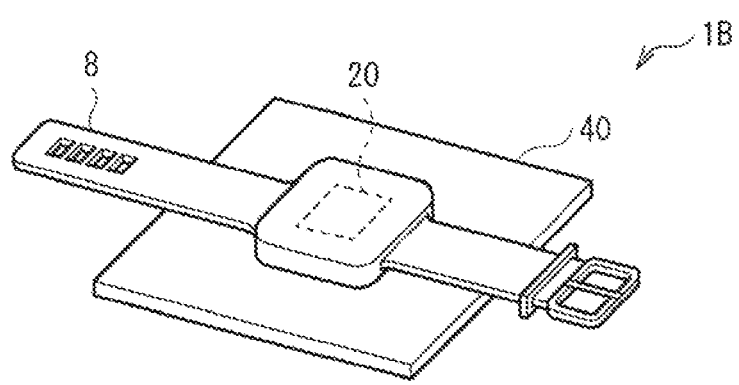

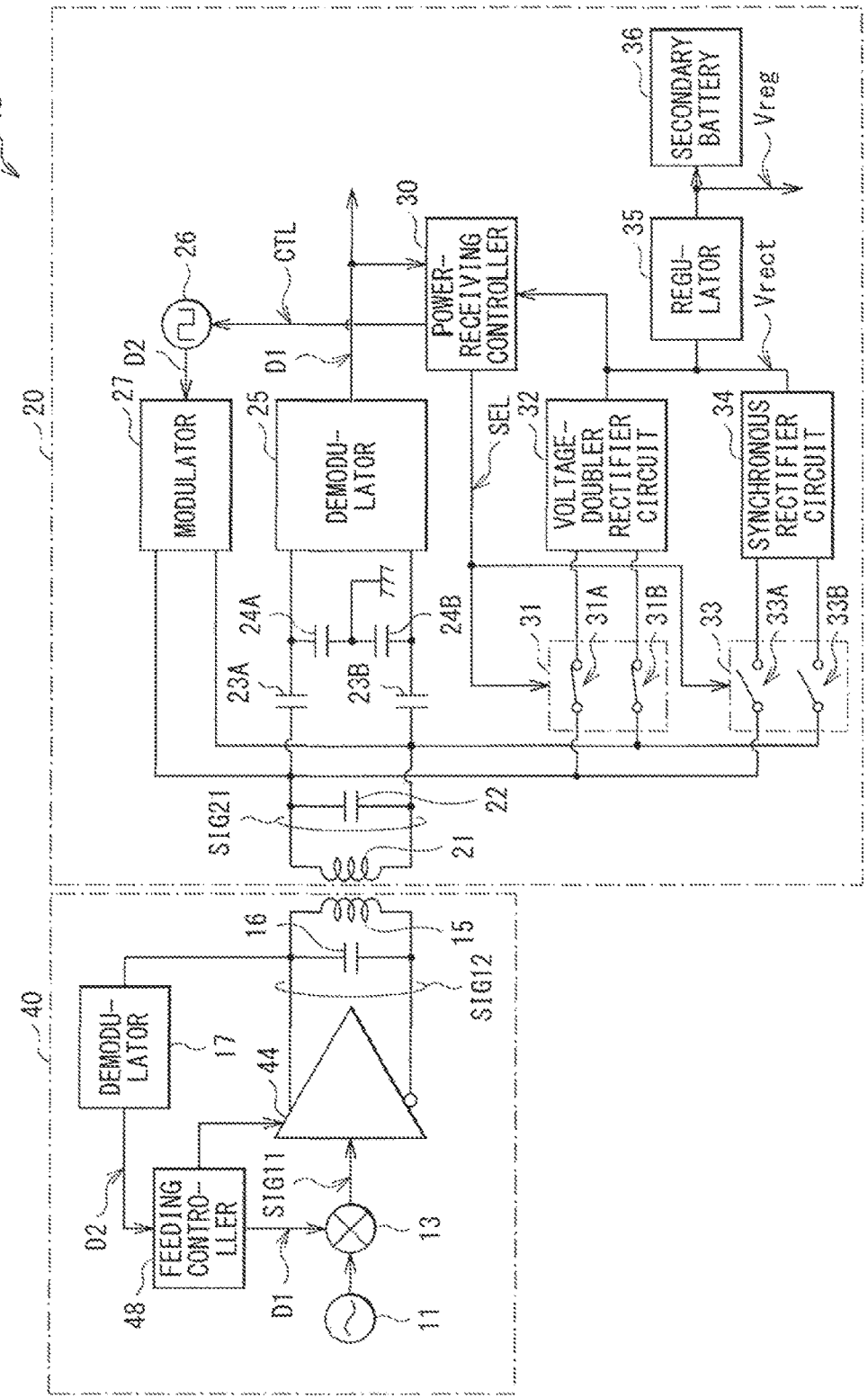
[FIG. 6]

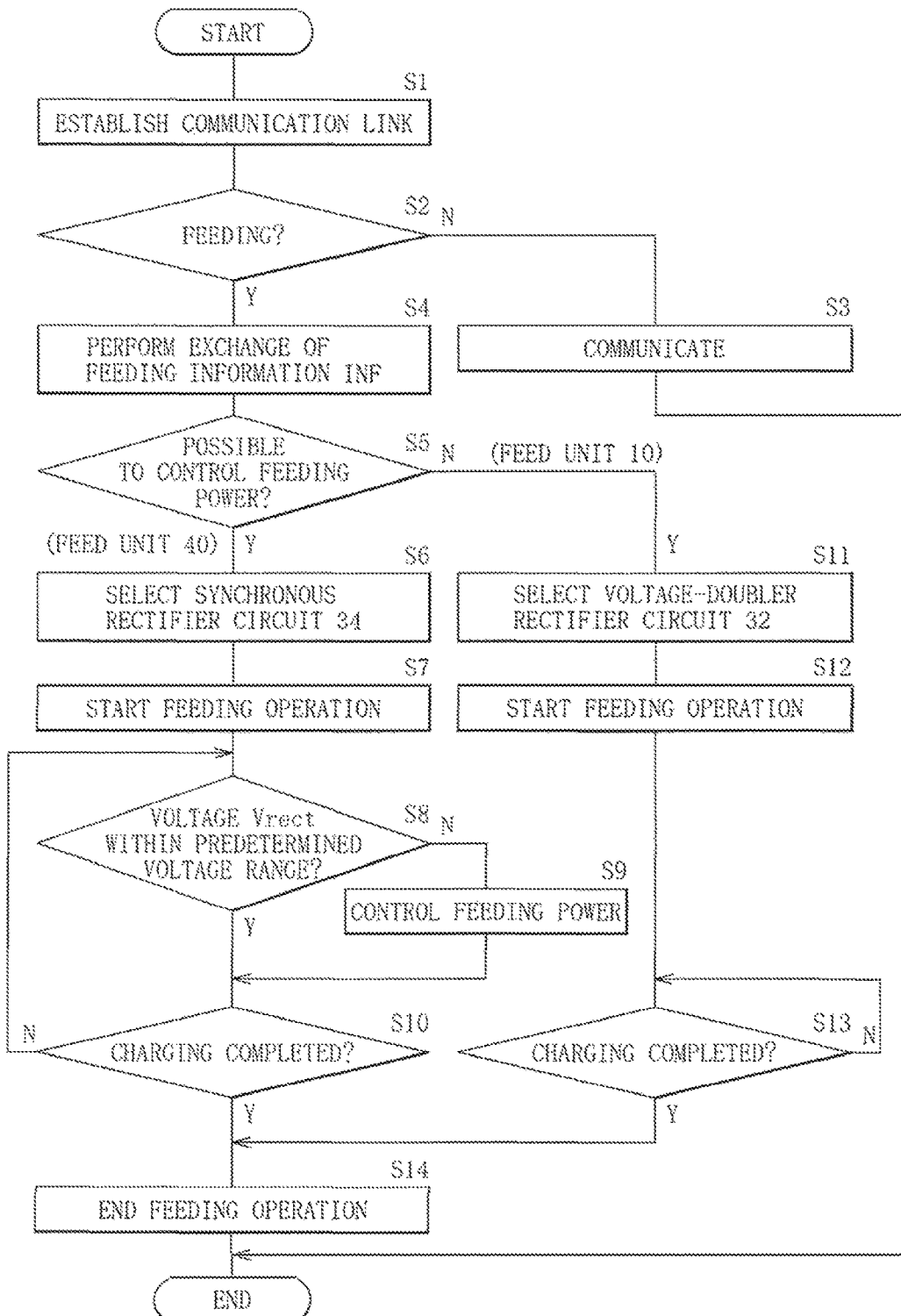
[FIG. 7]

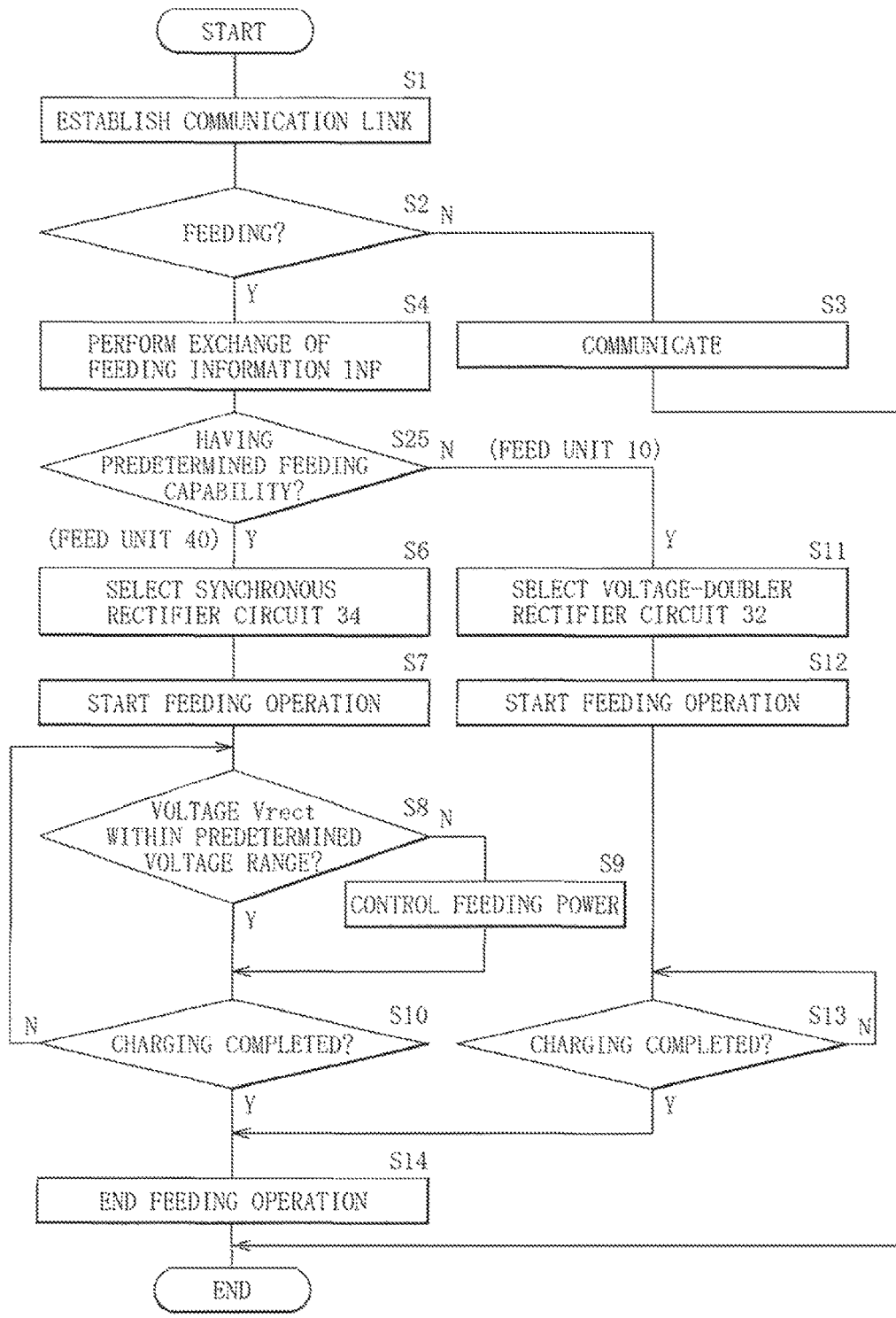
[ FIG. 8 ]

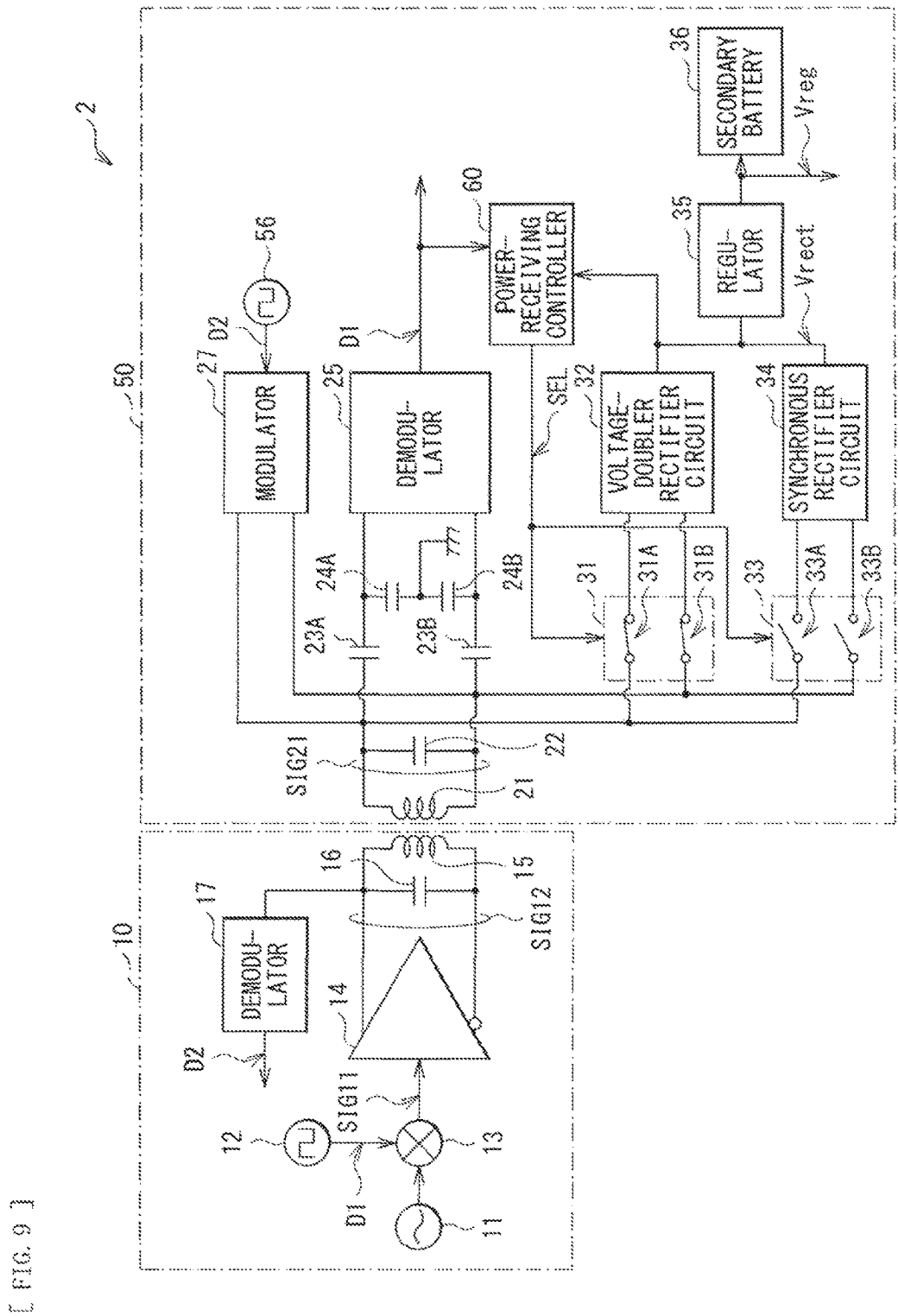
[ FIG. 9 ]

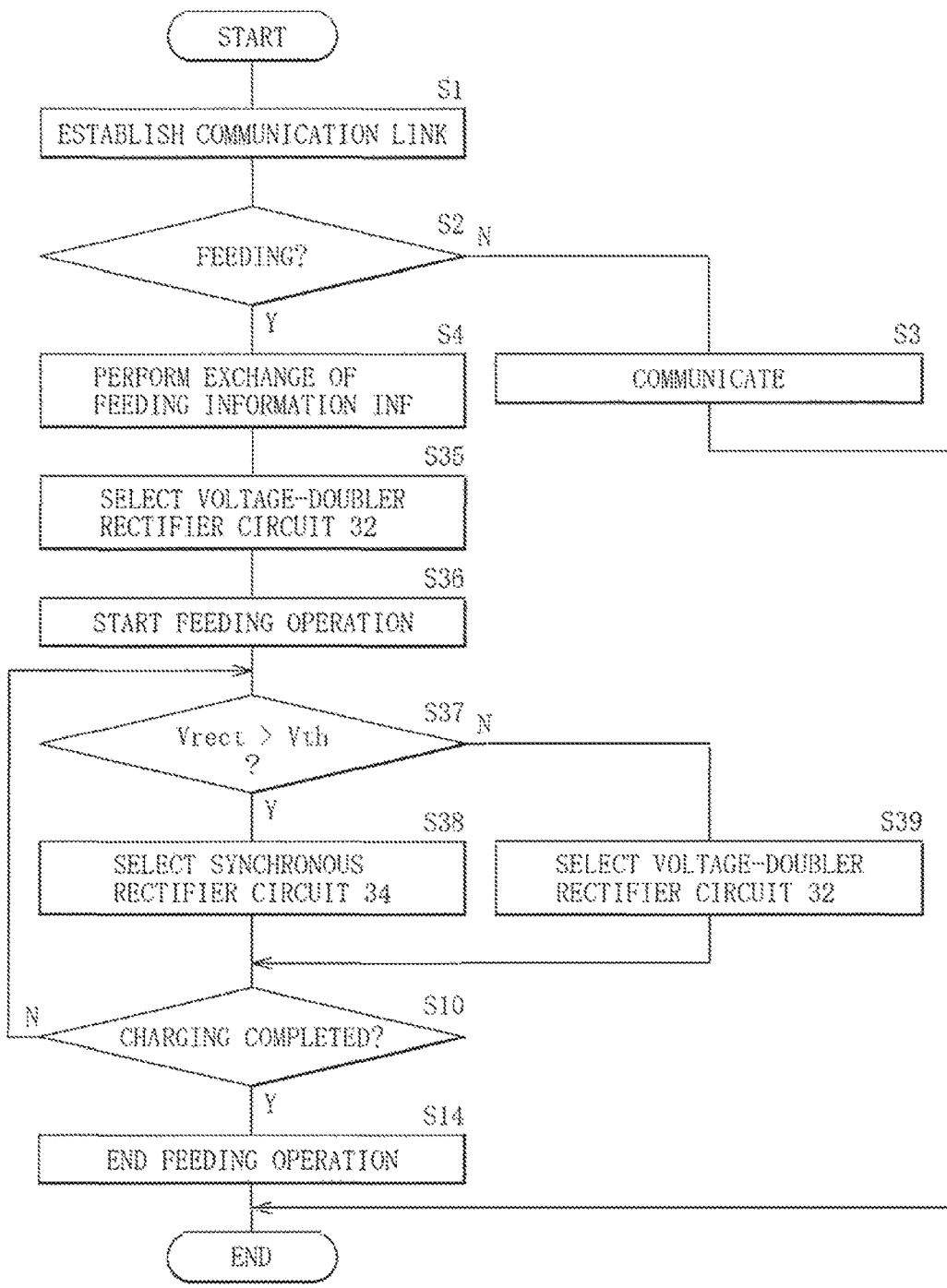

[FIG. 11]
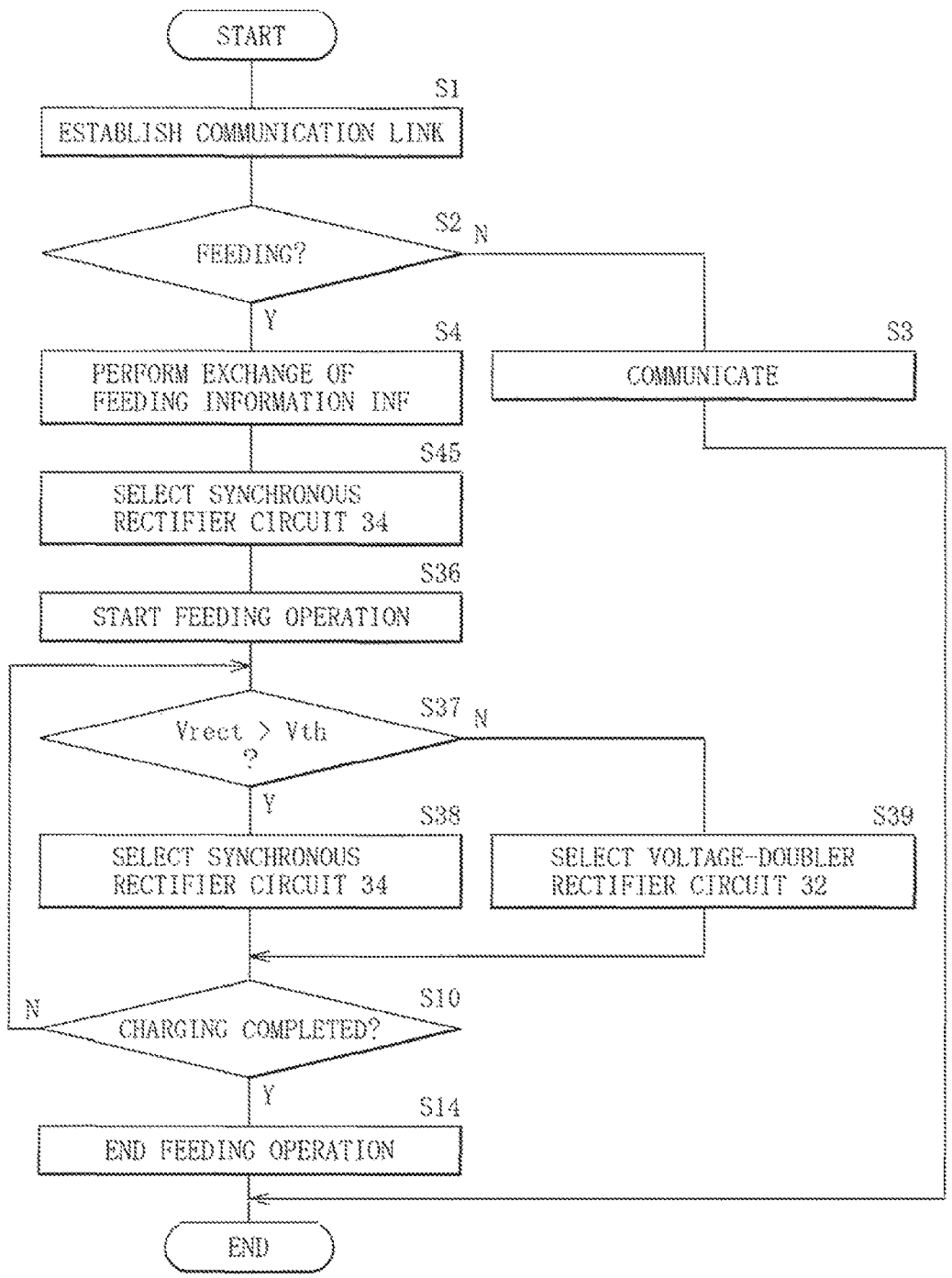

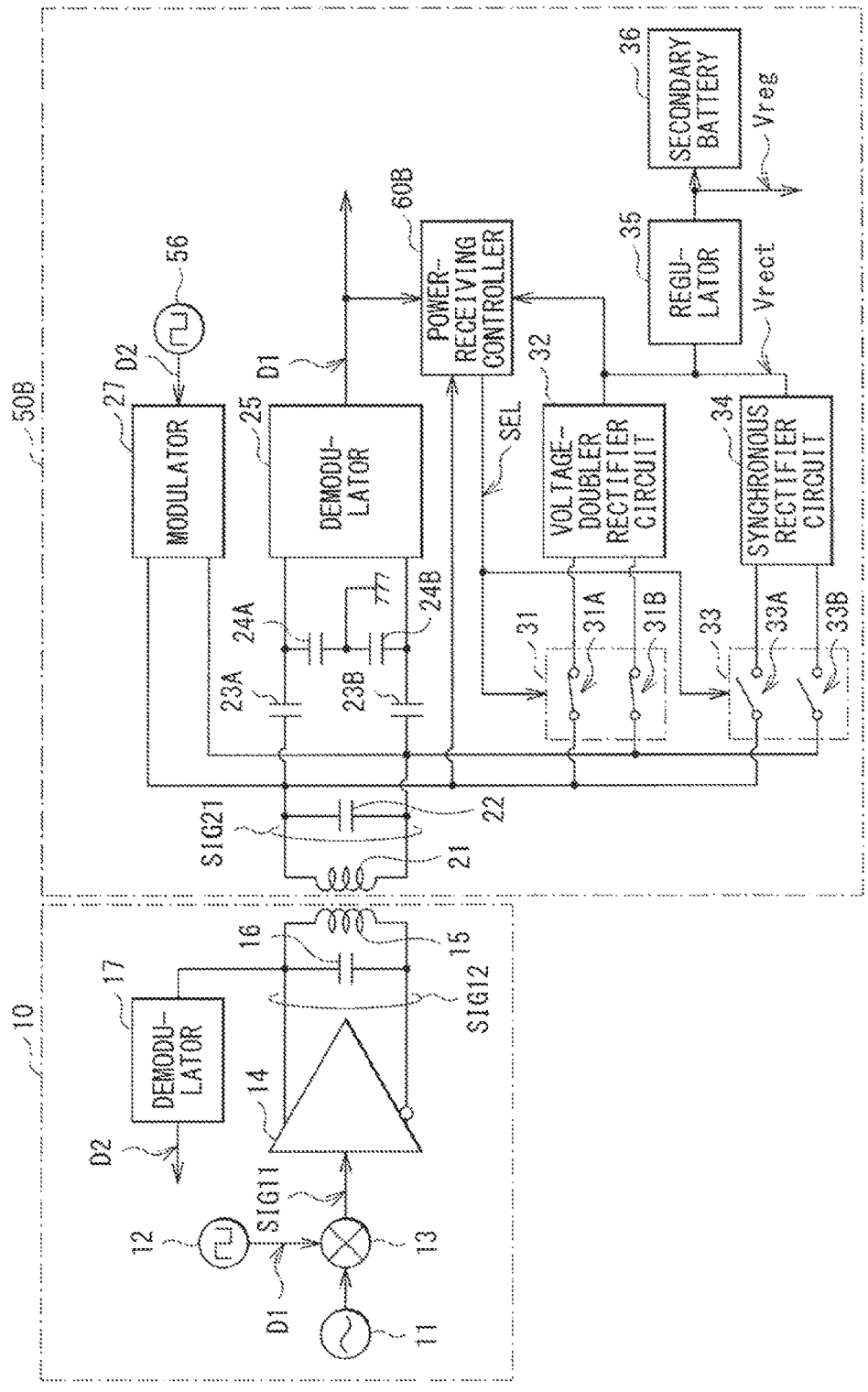
[ FIG. 12 ]

POWER RECEIVING UNIT, POWER RECEIVING METHOD, AND FEED SYSTEM

CROSS REFERENCE TO RELATED APPLICATIONS

This application is a U.S. National Phase of International Patent Application No. PCT/JP2016/060316 filed on Mar. 30, 2016, which claims priority benefit of Japanese Patent Application No. JP 2015-083178 filed in the Japan Patent Office on Apr. 15, 2015. Each of the above-referenced applications is hereby incorporated herein by reference in its entirety.

TECHNICAL FIELD

The disclosure relates to a power receiving unit that receives electric power supplied from a feed unit, a power receiving method used in such a power receiving unit, and a feed system including such a power receiving unit.

BACKGROUND ART

In recent years, a feed system that performs wireless feeding to an electronic apparatus has been receiving attention. Examples of a method of performing such wireless feeding include an electromagnetic induction method, and a magnetic field resonance method (which is also called a magnetic resonance method) utilizing a resonance phenomenon.

As such a feed system, there is a system that performs a communication operation, in addition to a feeding operation. For example, PTL 1 discloses a power receiving unit that communicates with a feed unit through a coil, and receives electric power through the coil.

CITATION LIST

Patent Literature

PTL 1: Japanese Unexamined Patent Application Publication No. 2010-284058

SUMMARY OF INVENTION

Incidentally, in a feed system, it is convenient if a power receiving unit is allowed to receive electric power supply from various feed units. In this way, in the feed system, it is expected to increase convenience.

It is therefore desirable to provide a power receiving unit, a power receiving method, and a feed system which make it possible to increase convenience.

A power receiving unit according to an embodiment of the disclosure includes a communicator, a power receiver, and a controller. The communicator communicates with a feed unit. The power receiver has a first rectifier circuit and a second rectifier circuit that each rectify an electric power signal supplied from the feed unit. The controller selects and operates one of the first rectifier circuit and the second rectifier circuit.

A power receiving method according to an embodiment of the disclosure includes: communicating with a feed unit; and selecting one of a first rectifier circuit and a second rectifier circuit that each rectify an electric power signal supplied from the feed unit.

A feed system according to an embodiment of the disclosure includes a feed unit and a power receiving unit. The power receiving unit includes a communicator, a power receiver, and a controller. The communicator communicates with the feed unit. The power receiver has a first rectifier circuit and a second rectifier circuit that each rectify an electric power signal supplied from the feed unit. The controller selects and operates one of the first rectifier circuit and the second rectifier circuit.

In the power receiving unit, the power receiving method, and the feed system according to the respective embodiments of the disclosure, communication with the feed unit is performed, and the electric power signal is supplied from the feed unit. At the time, one of the first rectifier circuit and the second rectifier circuits is selected, and the electric power signal is rectified by the selected rectifier circuit.

According to the power receiving unit, the power receiving method, and the feed system in the respective embodiments of the disclosure, since the first rectifier circuit and the second rectifier circuit are provided, it is possible to increase convenience. It is to be noted that the effects described herein are mere examples without being limitative, and any of effects described in the disclosure may also be provided.

BRIEF DESCRIPTION OF DRAWINGS

FIG. 1 is a perspective view of a configuration example of a feed system according to a first embodiment of the disclosure.

FIG. 2 is a block diagram illustrating a configuration example of each of a feed unit and a power receiving unit illustrated in FIG. 1.

FIG. 3 is a characteristic diagram illustrating a characteristic example in the feed system illustrated in FIG. 1.

FIG. 4 is a characteristic diagram illustrating another characteristic example in the feed system illustrated in FIG. 1.

FIG. 5 is a perspective view of a configuration example of another feed system according to the first embodiment.

FIG. 6 is a block diagram illustrating a configuration example of a feed unit illustrated in FIG. 5.

FIG. 7 is a flowchart illustrating an operation example of the feed system according to the first embodiment.

FIG. 8 is a flowchart illustrating an operation example of a feed system according to a modification example of the first embodiment.

FIG. 9 is a block diagram illustrating a configuration example of a power receiving unit according to a second embodiment.

FIG. 10 is a flowchart illustrating an operation example of a feed system according to the second embodiment.

FIG. 11 is a flowchart illustrating an operation example of a feed system according to a modification example of the second embodiment.

FIG. 12 is a block diagram illustrating a configuration example of a power receiving unit according to a modification example of the second embodiment.

DESCRIPTION OF EMBODIMENTS

Some embodiments of the disclosure will be described below in detail with reference to the drawings. It is to be noted that the description will be provided in the following order.
1. First Embodiment
2. Second Embodiment
<1. First Embodiment>
[Configuration Example]

FIG. 1 illustrates a configuration example of a feed system (a feed system 1A) including a power receiving unit according to a first embodiment. It is to be noted that a power receiving method according to an embodiment of the disclosure is embodied by the present embodiment and therefore will be described together therewith.

The feed system 1A includes a smartphone 7 and a wearable apparatus 8. The smartphone 7 has a function of performing near-field wireless communication (NFC). The wearable apparatus 8 is, in this example, a watch-type electronic apparatus, and has a function of performing the near-field wireless communication, as with the smartphone 7. In the feed system 1A, the smartphone 7 supplies electric power to the wearable apparatus 8, by utilizing this function of the near-field wireless communication.

The smartphone 7 has a feed unit 10. The feed unit 10 utilizes the function of the near-field wireless communication to communicate with the wearable apparatus 8 and supply the electric power to the wearable apparatus 8.

The wearable apparatus 8 has a power receiving unit 20. The power receiving unit 20 utilizes the function of the near-field wireless communication to communicate with the smartphone 7 and receive the electric power supplied from the smartphone 7.

FIG. 2 illustrates a configuration example of each of the feed unit 10 and the power receiving unit 20.

The feed unit 10 has a carrier-signal generator 11, a data generator 12, a modulator 13, an amplifier 14, a coil 15, a capacitor 16, and a demodulator 17.

The carrier-signal generator 11 generates a carrier signal for the near-field wireless communication. A frequency of the carrier signal is 13.56 MHz.

The data generator 12 generates data D1 to be transmitted. Further, the data generator 12 also has a function of generating the data D1 including feeding information INF, before the feed unit 10 performs a feeding operation. The feeding information INF includes information about the feeding operation and a feeding capability of the feed unit 10, and version information of the feed unit 10.

The modulator 13 generates a signal SIG11, by modulating the carrier signal by ASK modulation using the data D1.

The amplifier 14 generates a signal SIG12 on the basis of the signal SIG11, and outputs the signal SIG12 as an inter-terminal signal between a first output terminal and a second output terminal. The first output terminal of the amplifier 14 is coupled to one end of the coil 15 and one end of the capacitor 16. The second output terminal of the amplifier 14 is coupled to the other end of the coil 15 and the other end of the capacitor 16.

The coil 15 generates a magnetic field on the basis of the signal SIG12, and is coupled to a coil 21 (to be described later) of the power receiving unit 20 through the magnetic field. The one end of the coil 15 is coupled to the first output terminal of the amplifier 14 and the one end of the capacitor 16, and the other end of the coil 15 is coupled to the second output terminal of the amplifier 14 and the other end of the capacitor 16. The one end of the capacitor 16 is coupled to the one end of the coil 15 and the first output terminal of the amplifier 14, and the other end of the capacitor 16 is coupled to the other end of the coil 15 and the second output terminal of the amplifier 14. It is to be noted that, in the feed unit 10, the capacitor 16 is coupled to the coil 15 in parallel, but this is not limitative. For example, the capacitor 16 may be coupled to the coil 15 in series.

The demodulator 17 receives data D2 transmitted from the power receiving unit 20, by performing a demodulation operation on the basis of a voltage signal at the one end of the coil 15, and is configured using, for example, a so-called In-phase/Quadrature (I/Q) demodulator. In the feed system 1A, the power receiving unit 20 performs communication by load modulation, when transmitting the data D2 to the feed unit 10. Specifically, in a period in which the feed unit 10 transmits the carrier signal to the power receiving unit 20, a modulator 27 (to be described later) of the power receiving unit 20 changes a load viewed from the feed unit 10, depending on the data D2 to be transmitted. In the feed unit 10, this change of the load appears, for example, as a change of amplitude or phase of the voltage signal at the one end of the coil 15. The demodulator 17 receives the data D2 transmitted from the power receiving unit 20, by detecting the amplitude or phase of the voltage signal at the one end of the coil 15. Thereafter, the demodulator 17 supplies the data D2 to other block in the feed unit 10.

It is to be noted that, in this example, the demodulator 17 operates on the basis of the voltage signal at the one end of the coil 15, but is not limited thereto. For example, the demodulator 17 may operate on the basis of a voltage signal at the other end of the coil 15, or may operate on the basis of a voltage signal between both ends of the coil 15.

This configuration allows the feed unit 10 to transmit the data D1 to the power receiving unit 20 and receive the data D2 transmitted from the power receiving unit 20 in a case where a communication operation is performed. Further, in a case where the feeding operation is performed, first, the feed unit 10 transmits the feeding information INF as the data D1, and then supplies the electric power to the power receiving unit 20 by transmitting the carrier signal used in the near-field wireless communication. In this way, the feed unit 10 supplies the electric power by utilizing the function of the near-field wireless communication, and does not have a function of controlling feeding power. The feed unit 10 therefore supplies the electric power to the power receiving unit 20, without controlling the feeding power.

The power receiving unit 20 has the coil 21, capacitors 22, 23A, 23B, 24A, and 24B, a demodulator 25, a data generator 26, the modulator 27, a power-receiving controller 30, switch sections 31 and 33, a voltage-doubler rectifier circuit 32, a synchronous rectifier circuit 34, a regulator 35, and a secondary battery 36.

The coil 21 is coupled to the coil 15 of the feed unit 10 through a magnetic field, and generates a signal SIG21 corresponding to the signal SIG12 in the feed unit 10, by electromagnetic induction. One end of the coil 21 is coupled to one end of the capacitor 22, one end of the capacitor 23A, a first output terminal of the modulator 27, one end of a switch 31A (to be described later), and one end of a switch 33A (to be described later). The other end of the coil 21 is coupled to the other end of the capacitor 22, one end of the capacitor 23B, a second output terminal of the modulator 27, one end of a switch 31B (to be described later), and one end of a switch 33B (to be described later). The one end of the capacitor 22 is coupled to the one end of the coil 21, the one end of the capacitor 23A, the first output terminal of the modulator 27, the one end of the switch 31A, and the one end of the switch 33A. The other end of the capacitor 22 is coupled to the other end of the coil 21, the one end of the capacitor 23B, the second output terminal of the modulator 27, the one end of the switch 31B, and the one end of the switch 33B.

The one end of the capacitor 23A is coupled to the one end of the coil 21, the one end of the capacitor 22, the first output terminal of the modulator 27, the one end of the switch 31A (to be described later), and the one end of the switch 33A (to be described later). The other end of the capacitor 23A is coupled to one end of the capacitor 24A and a first input terminal of the demodulator 25. The one end of the capacitor 23B is coupled to the other end of the coil 21, the other end of the capacitor 22, the second output terminal of the modulator 27, the one end of the switch 31B (to be described later), and the one end of the switch 33B (to be described later). The other end of the capacitor 23B is coupled to one end of the capacitor 24B and a second input terminal of the demodulator 25. The one end of the capacitor 24A is coupled to the other end of the capacitor 23A and the first input terminal of the demodulator 25, and the other end of the capacitor 24A is grounded. The one end of the capacitor 24B is coupled to the other end of the capacitor 23B and the second input terminal of the demodulator 25, and the other end of the capacitor 24B is grounded.

The demodulator 25 receives the data D1 transmitted from the feed unit 10, by performing a demodulation operation on the basis of an inter-terminal voltage signal between the first input terminal and the second input terminal, and is configured using, for example, a so-called I/Q demodulator. The first input terminal of the demodulator 25 is coupled to the other end of the capacitor 23A and the one end of the capacitor 24A. The second input terminal of the demodulator 25 is coupled to the other end of the capacitor 23B and the one end of the capacitor 24B.

The data generator 26 generates the data D2 to be transmitted, and supplies the data D2 to the modulator 27. Further, the data generator 26 also has a function of generating the data D2 including feeding control information CTL, in a case where the feeding control information CTL is supplied from the power-receiving controller 30.

The modulator 27 performs load modulation on the basis of the data D2. The first output terminal of the modulator 27 is coupled to the one end of the coil 21, the one end of the capacitor 22, the one end of the capacitor 23A, the one end of the switch 31A (to be described later), and the one end of the switch 33A (to be described later). The second output terminal of the modulator 27 is coupled to the other end of the coil 21, the other end of the capacitor 22, the one end of the capacitor 23B, the one end of the switch 31B (to be described later), and the one end of the switch 33B (to be described later). In a period in which the feed unit 10 transmits the carrier signal to the power receiving unit 20, the modulator 27 changes an impedance between both ends of the coil 21, on the basis of the data D2. This causes a change in a load viewed from the feed unit 10, and the demodulator 17 of the feed unit 10 therefore receives the data D2, on the basis of this change in the load. The modulator 27 thus transmits the data D2 to the feed unit 10.

The power-receiving controller 30 controls a power receiving operation in the power receiving unit 20. Specifically, first, on the basis of the feeding information INF included in the data D1 transmitted from the feed unit 10, the power-receiving controller 30 determines whether a feed unit (in this example, the feed unit 10) that supplies electric power to the power receiving unit 20 has a function of controlling feeding power. Thereafter, in a case where the feed unit has the function of controlling the feeding power, the power-receiving controller 30 controls the switch section 33 and the switch section 31 to respectively be in an ON state and in an OFF state, by using a control signal SEL. Thereafter, further, on the basis of a voltage Vrect, the power-receiving controller 30 generates the feeding control information CTL including information necessary for control of the feeding power, such as a request to the feed unit 10 for an increase or a decrease in the feeding power. Furthermore, in a case where the feed unit does not have the function of controlling the feeding power, as with, for example, the feed unit 10, the power-receiving controller 30 controls the switch section 31 and the switch section 33 to be respectively in an ON state and in an OFF state, by using the control signal SEL.

The switch section 31 turns on and off supply of a voltage signal between both ends of the coil 21 to the voltage-doubler rectifier circuit 32, on the basis of the control signal SEL. The switch section 31 has the switches 31A and 31B. The one end of the switch 31A is coupled to the one end of the coil 21, the one end of the capacitor 22, the one end of the capacitor 23A, the first output terminal of the modulator 27, and the one end of the switch 33A (to be described later). The other end of the switch 31A is coupled to a first input terminal of the voltage-doubler rectifier circuit 32. The one end of the switch 31B is coupled to the other end of the coil 21, the other end of the capacitor 22, the one end of the capacitor 23B, the second output terminal of the modulator 27, and the one end of the switch 33B (to be described later). The other end of the switch 31B is coupled to a second input terminal of the voltage-doubler rectifier circuit 32.

The voltage-doubler rectifier circuit 32 is a circuit that generates the voltage Vrect, by boosting the voltage signal between both ends of the coil 21 while performing rectification, in a case where the switch section 31 is in the ON state. The first input terminal of the voltage-doubler rectifier circuit 32 is coupled to the other end of the switch 31A, and the second input terminal of the voltage-doubler rectifier circuit 32 is coupled to the other end of the switch 31B. Further, the voltage-doubler rectifier circuit 32 changes an output impedance to a high impedance in a case where the switch section 31 is in the OFF state.

It is to be noted that, in this example, the voltage-doubler rectifier circuit 32 is used, but this is not limitative and, any type of circuit may be used, as long as the circuit boosts a voltage signal supplied through the switch section 31, while performing rectification.

The switch section 33 turns on and off supply of the voltage signal between both ends of the coil 21 to the synchronous rectifier circuit 34, on the basis of the control signal SEL. The switch section 33 has the switches 33A and 33B. The one end of the switch 33A is coupled to the one end of the coil 21, the one end of the capacitor 22, the one end of the capacitor 23A, the first output terminal of the modulator 27, and the one end of the switch 31A. The other end of the switch 33A is coupled to a first input terminal of the synchronous rectifier circuit 34. The one end of the switch 33B is coupled to the other end of the coil 21, the other end of the capacitor 22, the one end of the capacitor 23B, the second output terminal of the modulator 27, and the one end of the switch 31B. The other end of the switch 33B is coupled to a second input terminal of the synchronous rectifier circuit 34.

The synchronous rectifier circuit 34 is a circuit that generates the voltage Vrect, by rectifying the voltage signal between both ends of the coil 21 by synchronous rectification, in a case where the switch section 33 is in the ON state. In other words, it is possible for the synchronous rectifier circuit 34 to perform a rectification operation at high efficiency. The first input terminal of the synchronous rectifier circuit 34 is coupled to the other end of the switch 33A, and the second input terminal of the synchronous rectifier circuit 34 is coupled to the other end of the switch 33B. Further, the synchronous rectifier circuit 34 changes an output impedance to a high impedance in a case where the switch section 33 is in the OFF state.

It is to be noted that, in this example, the synchronous rectifier circuit 34 is used, but this is not limitative and, for example, a half synchronous rectifier circuit may be used. In a case where other circuit is used, it is desirable for the circuit to be able to perform a rectification operation at high efficiency.

This configuration allows the power-receiving controller 30 to select one of two rectifier circuits (the voltage-doubler rectifier circuit 32 or the synchronous rectifier circuit 34) by using the control signal SEL, on the basis of the feeding information INF included in the data D1 transmitted from the feed unit 10. Thereafter, the selected rectifier circuit generates the voltage Vrect, on the basis of the voltage signal between both ends of the coil 21.

The regulator 35 generates DC power having a voltage Vreg, on the basis of a DC signal (the voltage Vrect) outputted from the voltage-doubler rectifier circuit 32 or the synchronous rectifier circuit 34. Thereafter, the regulator 35 supplies the voltage Vreg as a power supply voltage to each block in the power receiving unit 20, and charges the secondary battery 36.

The secondary battery 36 accumulates the DC power supplied from the regulator 35, and is configured using, for example, a rechargeable battery such as a lithium ion battery. Further, the secondary battery 36 supplies electric power to various circuits and devices that are provided to implement functions of the wearable apparatus 8.

FIG. 3 illustrates an example of receiving power in the power receiving unit 20, and FIG. 4 illustrates an example of the voltage Vrect when the synchronous rectifier circuit 34 is selected. In FIGS. 3 and 4, a horizontal axis indicates a position of the wearable apparatus 8 (the power receiving unit 20) on the smartphone 7 (the feed unit 10). As illustrated in FIG. 3, the receiving power in the power receiving unit 20 changes, depending on a relative positional relationship between the wearable apparatus 8 and the smartphone 7. At a position where the receiving power becomes a maximum, the voltage Vrect is about 4.7 V at maximum, in this example, as illustrated in FIG. 4. The voltage Vrect of about 4.7 V is not very high as compared with a voltage (e.g., 4.3 V) in an ordinary lithium ion battery. In this way, the feed unit 10 supplies the electric power by utilizing the function of the near-field wireless communication, and does not have the function of controlling the feeding power, which causes the voltage Vrect to become slightly low.

Accordingly, in the power receiving unit 20, the power-receiving controller 30 selects the voltage-doubler rectifier circuit 32 in a case where a feed unit (in this example, the feed unit 10) that supplies electric power to the power receiving unit 20 does not have the function of controlling the feeding power. This makes it possible to increase the voltage Vrect in the power receiving unit 20 and thus, it is possible to charge the secondary battery 36, even though the position of the wearable apparatus 8 is misaligned.

It is possible for the wearable apparatus 8 including the above-described power receiving unit 20 to receive electric power from various devices other than the smartphone 7. Another feed system 1B in the power receiving unit 20 will be described below.

FIG. 5 illustrates a configuration example of the feed system 1B. The feed system 1B includes a feed unit 40. The feed unit 40 is a tray-type feed unit, and performs the near-field wireless communication with the wearable apparatus 8, thereby supplying electric power to the wearable apparatus 8, while controlling feeding power.

FIG. 6 illustrates a configuration example of the feed unit 40. It is to be noted that FIG. 6 illustrates, in addition to the feed unit 40, the power receiving unit 20 illustrated in FIG. 2. The feed unit 40 has a feeding controller 48 and an amplifier 44. Before the feed unit 40 performs a feeding operation, the feeding controller 48 generates the data D1 including the feeding information INF, as with the data generator 12 of the feed unit 10. Further, the feeding controller 48 also has a function of controlling the feeding power, by controlling the amplifier 44, on the basis of the feeding control information CTL included in the data D2 transmitted from the power receiving unit 20. The amplifier 44 changes the feeding power, by changing, for example, the amplitude of the signal SIG12, on the basis of an instruction from the feeding controller 48. It is to be noted that, in the feed unit 40, the capacitor 16 is coupled to the coil 15 in parallel, as with the feed unit 10 (FIG. 2), but this is not limitative. The capacitor 16 may be coupled to the coil 15 in series.

Here, the demodulator 25 and the modulator 27 correspond to a specific example of a "communicator" in the disclosure. The voltage-doubler rectifier circuit 32 corresponds to a specific example of a "first rectifier circuit" in the disclosure. The synchronous rectifier circuit 34 corresponds to a specific example of a "second rectifier circuit" in the disclosure. The power-receiving controller 30 corresponds to a specific example of a "controller" in the disclosure.

[Operation and Action]

Next, operation and action of each of the feed systems 1A and 1B of the present embodiment will be described.

(Outline of Overall Operation)

First, an outline of an overall operation of each of the feed systems 1A and 1B will be described with reference to FIGS. 2 and 6. In the feed system 1A (FIG. 2), first, the data generator 12 of the feed unit 10 generates the data D1 including the feeding information INF. The modulator 13 generates the signal SIG11, by modulating the carrier signal by the ASK modulation using the data D1. The amplifier 14 generates the signal SIG12 on the basis of the signal SIG11. The coil 15 generates the magnetic field on the basis of the signal SIG12. In the power receiving unit 20, the coil 21 generates the signal SIG21 on the basis of the magnetic field generated by the coil 15, and the demodulator 25 receives the data D1 transmitted from the feed unit 10, by performing the demodulation operation on the basis of the signal SIG21. The power-receiving controller 30 determines that the feed unit 10 does not have the function of controlling the feeding power on the basis of the feeding information INF included in the data D1, and brings the switch section 31 into the ON state and the switch section 33 into the OFF state, by using the control signal SEL. In this state, when the feed unit 10 starts performing the feeding operation by transmitting the carrier signal, the voltage-doubler rectifier circuit 32 of the power receiving unit 20 generates the voltage Vrect, by boosting the voltage signal between both ends of the coil 21 while performing rectification. The regulator 35 generates the DC power having the voltage Vreg, on the basis of the DC signal (the voltage Vrect) supplied from the voltage-doubler rectifier circuit 32. Thereafter, the secondary battery 36 accumulates the DC power supplied from the regulator 35.

In the feed system 1B (FIG. 6), first, the feeding controller 48 of the feed unit 40 generates the data D1 including the feeding information INF. Thereafter, as with the case of the feed system 1A, the demodulator 25 of the power receiving unit 20 receives the data D1. The power-receiving controller 30 determines that the feed unit 10 has the function of controlling the feeding power on the basis of the feeding information INF included in the data D1, and controls the switch section 33 and the switch section 31 to be respectively in the ON state and in the OFF state, by using the control signal SEL. In this state, when the feed unit 40 starts the feeding operation by transmitting the carrier signal, the synchronous rectifier circuit 34 of the power receiving unit 20 generates the voltage Vrect, by rectifying the voltage signal between both ends of the coil 21 by the synchronous rectification. At the time, on the basis of the voltage Vrect, the power-receiving controller 30 generates the feeding control information CTL including the information necessary for control of the feeding power, such as the request to the feed unit 10 for the increase or the decrease in the feeding power, and the modulator 27 transmits the data D2 including the feeding control information CTL by the load modulation. The demodulator 17 of the feed unit 10 receives the data D2, and the feeding controller 48 changes the feeding power, on the basis of the feeding control information CTL included in the data D2. In this way, the output voltage Vrect of the synchronous rectifier circuit 34 is controlled to become a voltage within a predetermined voltage range. The regulator 35 generates the DC power having the voltage Vreg, on the basis of the DC signal (the voltage Vrect) supplied from the synchronous rectifier circuit 34. Thereafter, the secondary battery 36 accumulates the DC power supplied from the regulator 35.

(Detailed Operation)

FIG. 7 illustrates an operation example of each of the feed systems 1A and 1B. In each of the feed systems 1A and 1B, first, a communication link through the near-field wireless communication is established, and exchange of the feeding information INF is performed. Thereafter, on the basis of the feeding information INF, the power receiving unit 20 selects a rectifier circuit to be used, from the voltage-doubler rectifier circuit 32 and the synchronous rectifier circuit 34, and each of the feed units 10 and 40 starts the feeding operation by transmitting the carrier signal. This operation will be described below in detail.

First, each of the feed systems 1A and 1B establishes the communication link (step S1). Specifically, for example, each of the feed units 10 and 40 performs polling using the near-field wireless communication to make an inquiry to the power receiving unit 20 in neighborhood. The power receiving unit 20 responds to the inquiry by causing the modulator 27 to perform the load modulation. In this way, each of the feed units 10 and 40, and the power receiving unit 20 establish the communication link by performing the near-field wireless communication.

Next, each of the feed units 10 and 40 and the power receiving unit 20 decide whether to perform communication or feeding, by communicating through the near-field wireless communication (step S2). In a case where it is decided to perform the communication ("N" in step S2), each of the feed units 10 and 40 and the power receiving unit 20 communicate with each other (step S3) and then, this flow ends.

In step S2, in a case where it is decided to perform the feeding ("Y" in step S2), each of the feed systems 1A and 1B performs exchange of the feeding information INF (step S4). Specifically, in the case of the feed system 1A, the data generator 12 of the feed unit 10 generates the data D1 including the feeding information INF. Further, in the case of the feed system 1B, the feeding controller 48 of the feed unit 40 generates the data D1 including the feeding information INF. Each of the feed units 10 and 40 supplies the data D1 to the power receiving unit 20. Thereafter, the demodulator 25 of the power receiving unit 20 receives the data D1.

Next, the power-receiving controller 30 of the power receiving unit 20 confirms whether the feed unit that supplies the electric power to the power receiving unit 20 has the function of controlling the feeding power, on the basis of the feeding information INF (step S5). Specifically, for example, the power-receiving controller 30 determines whether the feed unit has the function of controlling the feeding power, on the basis of the version information of the feed unit included in the feeding information INF. Further, for example, in a case where flag information indicating whether the feed unit has the function of controlling the feeding power is included in the feeding information INF, the power-receiving controller 30 may make such a determination on the basis of the flag information.

In this example, in a case where the feed unit is the feed unit 10 related to the feed system 1A, the power-receiving controller 30 determines that the feed unit does not have the function of controlling the feeding power, on the basis of the feeding information INF. Further, in a case where the feed unit is the feed unit 40 related to the feed system 1B, the power-receiving controller 30 determines that the feed unit has the function of controlling the feeding power, on the basis of the feeding information INF.

In step S5, in a case where the feed unit has the function of controlling the feeding power ("Y" in step S5), the power-receiving controller 30 selects the synchronous rectifier circuit 34 (step S6). In other words, for example, in a case where the feed unit is the feed unit 40 related to the feed system 1B (FIG. 6), the power-receiving controller 30 selects the synchronous rectifier circuit 34. Specifically, the power-receiving controller 30 controls the switch section 33 and the switch section 31 to respectively be in the ON state and in the OFF state, by using the control signal SEL. Hence, the first input terminal of the synchronous rectifier circuit 34 is coupled to the one end of the coil 21, and the second input terminal of the synchronous rectifier circuit 34 is coupled to the other end of the coil 21. Thus, the synchronous rectifier circuit 34 is selected.

Next, the feed unit 40 starts the feeding operation (step S7). Specifically, the modulator 13 of the feed unit 40 generates the signal SIG11 without performing the ASK modulation. Thereafter, the amplifier 14 generates the signal SIG12 on the basis of the signal SIG11. In other words, the feed unit 40 transmits the carrier signal to the power receiving unit 20. Hence, in the power receiving unit 20, the synchronous rectifier circuit 34 generates the voltage Vrect.

Next, the power-receiving controller 30 confirms whether the voltage Vrect is within a predetermined voltage range (step S8). Thereafter, in a case where the voltage Vrect is within the predetermined voltage range ("Y" in step S8), the operation proceeds to step S10. Further, in a case where the voltage Vrect is not within the predetermined voltage range ("N" in step S8), the power-receiving controller 30 controls the feeding power (step S9). Specifically, the power-receiving controller 30 generates the feeding control information CTL including the request for the increase in the feeding power in a case where the voltage Vrect is low, and generates the feeding control information CTL including the request for the decrease in the feeding power in a case where the voltage Vrect is high. Thereafter, the data generator 26 generates the data D2 including the feeding control information CTL, and the modulator 27 transmits the data D2. The demodulator 17 of the feed unit 40 receives the data D2, and the feeding controller 48 controls the feeding power, by controlling the amplifier 44, on the basis of the feeding control information CTL included in the data D2. Thereafter, the operation proceeds to step S10.

Next, the power-receiving controller 30 confirms whether charging the secondary battery 36 is completed (step S10). Specifically, for example, the power-receiving controller 30 confirms whether charging the secondary battery 36 is completed, on the basis of a charge level in the secondary battery 36. In a case where the charging is not completed ("N" in step S10), the operation returns to step S8, and step S8 to step S10 are repeated until the charging is completed. Further, in a case where the charging is completed ("Y" in step S10), the operation proceeds to step S14.

In step S5, in a case where the feed unit does not have the function of controlling the feeding power ("N" in step S5), the power-receiving controller 30 selects the voltage-doubler rectifier circuit 32 (step S11). In other words, for example, in a case where the feed unit is the feed unit 10 related to the feed system 1A (FIG. 2), the power-receiving controller 30 selects the voltage-doubler rectifier circuit 32. Specifically, the power-receiving controller 30 controls the switch section 31 and the switch section 33 to be respectively in the ON state and in the OFF state, by using the control signal SEL. Hence, the first input terminal of the voltage-doubler rectifier circuit 32 is coupled to the one end of the coil 21, and the second input terminal of the voltage-doubler rectifier circuit 32 is coupled to the other end of the coil 21. Thus, the voltage-doubler rectifier circuit 32 is selected.

Next, the feed unit 10 starts the feeding operation (step S12). Specifically, the modulator 13 of the feed unit 10 generates the signal SIG11, without performing the ASK modulation. Thereafter, the amplifier 14 generates the signal SIG12 on the basis of the signal SIG11. In other words, the feed unit 10 transmits the carrier signal to the power receiving unit 20. Hence, in the power receiving unit 20, the voltage-doubler rectifier circuit 32 generates the voltage Vrect.

Next, the power-receiving controller 30 confirms whether charging the secondary battery 36 is completed (step S13). In a case where the charging is not completed ("N" in step S13), the operation returns to step S13, and step S13 is repeated until the charging is completed. Further, in a case where the charging is completed ("Y" in step S13), the operation proceeds to step S14.

Next, each of the feed units 10 and 40 ends the feeding operation (step S14). Specifically, the power-receiving controller 30 of the power receiving unit 20 generates the data D2 including the feeding control information CTL that includes a feeding stop request, and the modulator 27 transmits the data D2. Thereafter, each of the feed units 10 and 40 stops the feeding operation, on the basis of the feeding control information CTL included in the data D2.

This flow thus ends.

In this way, in the power receiving unit 20, two rectifier circuits (the voltage-doubler rectifier circuit 32 and the synchronous rectifier circuit 34) are provided and thus, it is possible to increase convenience to a user. In other words, for example, in a case where only the synchronous rectifier circuit 34 is provided, if an attempt is made to receive the supply of the electric power from the smartphone 7 (FIG. 1) including the feed unit 10 that does not have the function of controlling the feeding power, the voltage Vrect becomes low, which may make it difficult to charge the secondary battery 36. In addition, for example, in a case where only the voltage-doubler rectifier circuit 32 is provided, a reduction occurs in efficiency when receiving the supply of the electric power from the feed unit 40 (FIG. 5) having the function of controlling the feeding power. In contrast, in the power receiving unit 20, since two rectifier circuits are provided, it is possible to select the voltage-doubler rectifier circuit 32 that has an ability to raise the voltage Vrect, in a case where the supply of the electric power is received from the feed unit 10 that does not have the function of controlling the feeding power, and it is possible to select the synchronous rectifier circuit 34 having high efficiency, in a case where the supply of the electric power is received from the feed unit 40 having the function of controlling the feeding power. In this way, in the power receiving unit 20, it is possible to receive the supply of the electric power from various feed units, which makes it possible to increase the convenience to the user.

Further, in the power receiving unit 20, since the voltage-doubler rectifier circuit 32 is provided, it is possible to increase the convenience to the user, in a case where the electric power is received from the feed unit 10 that does not have the function of controlling the feeding power. In other words, many electronic apparatuses each having the function of the near-field wireless communication are available on the market. In general, such electronic apparatuses are not assumed to supply the electric power to other electronic apparatuses, and do not have the function of controlling the feeding power. Hence, in a case where only the synchronous rectifier circuit 34 is provided, if an attempt is made to receive the supply of the electric power from such an electronic apparatus, the voltage Vrect becomes low, which may make it difficult to charge the secondary battery 36. In contrast, in the power receiving unit 20, the voltage-doubler rectifier circuit 32 is provided, which makes it possible to raise the voltage Vrect and to receive the supply of the electric power. In this way, in the power receiving unit 20, it is possible to receive the supply of the electric power from many electronic apparatuses each having the function of the near-field wireless communication, which makes it possible to increase the convenience of the user.

In addition, in the power receiving unit 20, providing the voltage-doubler rectifier circuit 32 makes it possible to raise the voltage Vrect, in a case where the supply of the electric power is received from the feed unit 10 that does not have the function of controlling the feeding power. As a result, even though the position of the wearable apparatus 8 is misaligned, it is possible to charge the secondary battery 36, which makes it possible to increase the convenience to the user.

[Effects]

As described above, in the present embodiment, since two rectifier circuits are provided, it is possible to receive the supply of the electric power from various feed units, which makes it possible to increase the convenience to the user.

In the present embodiment, since the voltage-doubler rectifier circuit is provided, it is possible to receive the supply of the electric power from various electronic apparatuses available on the market, which makes it possible to increase the convenience to the user. Moreover, even though the position of the power receiving unit is misaligned, it is possible to charge the secondary battery, which makes it possible to increase the convenience to the user.

[Modification Example 1]

In the above-described embodiment, the rectifier circuit to be used is selected, on the basis of whether the feed unit has the function of controlling the feeding power, but this is not limitative. Instead of this, for example, the rectifier circuit to be used may be selected on the basis of whether the feed unit has a predetermined feeding capability, as illustrated in FIG.

8. In this example, the power-receiving controller 30A according to the present modification example confirms whether the feed unit has the predetermined feeding capability, on the basis of the feeding information INF (step S25). Specifically, for example, the power-receiving controller 30A determines whether the feed unit has the predetermined feeding capability, by acquiring maximum feeding power of the feed unit on the basis of the feeding information INF, and confirming whether the maximum feeding power is greater than predetermined feeding power. Thereafter, in a case where the feed unit has the predetermined feeding capability ("Y" in step S25), the power-receiving controller 30A selects the synchronous rectifier circuit 34 (step S6), and, in a case where the feed unit does not have the predetermined feeding capability ("N" in step S25), the power-receiving controller 30A selects the voltage-doubler rectifier circuit 32.

<2. Second Embodiment>

Next, a feed system 2 according to a second embodiment will be described. In the present embodiment, the rectifier circuit to be used is selected on the basis of the voltage Vrect. It is to be noted that components substantially identical to those of the feed system 1A according to the above-described first embodiment are provided with reference numerals identical to those thereof, and description of these components will be omitted as appropriate.

The feed system 2 includes the smartphone 7 and a wearable apparatus 9, as illustrated in FIG. 1. The wearable apparatus 9 has a power receiving unit 50.

FIG. 9 illustrates a configuration example of the power receiving unit 50. It is to be noted that FIG. 9 illustrates the feed unit 10 of the smartphone 7, in addition to the power receiving unit 50. The power receiving unit 50 has a data generator 56 and a power-receiving controller 60. The data generator 56 generates the data D2 to be transmitted, and supplies the data D2 to the modulator 27. The power-receiving controller 60 receives the feeding information INF included in the data D1, and selects the rectifier circuit to be used, on the basis of the voltage Vrect. Specifically, in a case where the voltage Vrect is higher than a predetermined voltage Vth, the power-receiving controller 60 controls the switch section 33 and the switch section 31 to be respectively in the ON state and in the OFF state, by using the control signal SEL. Hence, the power-receiving controller 60 selects the synchronous rectifier circuit 34. Further, in a case where the voltage Vrect is equal to or less than the predetermined voltage Vth, the power-receiving controller 60 controls the switch section 31 and the switch section 33 to be respectively in the ON state and in the OFF state, by using the control signal SEL. Hence, the power-receiving controller 60 selects the voltage-doubler rectifier circuit 32.

FIG. 10 illustrates an operation example in the feed system 2.

First, as with the case of each of the feed systems 1A and 1B according to the first embodiment, the feed system 2 establishes a communication link (step Si). Thereafter, the feed unit 10 and the power receiving unit 50 determine whether to perform communication or feeding, by communicating through the near-field wireless communication (step S2). In a case where it is decided to perform the communication ("N" in step S2), the feed unit 10 and the power receiving unit 20 communicate with each other (step S3), and this flow ends.

In step S2, in a case where it is decided to perform the feeding ("Y" in step S2), the feed system 2 performs exchange of the feeding information INF (step S4).

Next, the power-receiving controller 60 of the power receiving unit 50 selects the voltage-doubler rectifier circuit 32 (step S35).

Next, the feed unit 10 starts the feeding operation (step S36). Specifically, the feed unit 10 transmits the carrier signal to the power receiving unit 50. Hence, in the power receiving unit 50, the voltage-doubler rectifier circuit 32 generates the voltage Vrect.

Next, the power-receiving controller 60 confirms whether the voltage Vrect is greater than the predetermined voltage Vth (step S37). In a case where the voltage Vrect is greater than the predetermined voltage Vth ("Y" in step S37), the power-receiving controller 60 selects the synchronous rectifier circuit 34 (step S38). In a case where the synchronous rectifier circuit 34 has been already selected, the synchronous rectifier circuit 34 remains selected. Further, in a case where the voltage Vrect is equal to or less than the predetermined voltage Vth ("N" in step S37), the power-receiving controller 60 selects the voltage-doubler rectifier circuit 32 (step S39). In a case where the voltage-doubler rectifier circuit 32 has been already selected, the voltage-doubler rectifier circuit 32 remains selected. It is to be noted that, since the voltage Vrect to be outputted by the voltage-doubler rectifier circuit 32 is about double the voltage Vrect to be outputted by the synchronous rectifier circuit 34, it is desirable to correct the predetermined voltage Vth, in a case where the rectifier circuit to be used is changed.

Next, the power-receiving controller 60 confirms whether charging the secondary battery 36 is completed (step S40). In a case where the charging is not completed ("N" in step S40), the operation returns to step S37, and step S37 to step S40 are repeated until the charging is completed. Further, in a case where the charging is completed ("Y" in step S40), the feed unit 10 ends the feeding operation (step S14).

This flow thus ends.

In this way, in the power receiving unit 50, the voltage-doubler rectifier circuit 32 is provided, which makes it possible to increase the convenience to the user. In other words, many electronic apparatuses each having the function of the near-field wireless communication are available on the market. In general, such electronic apparatuses are not assumed to supply the electric power to other electronic apparatuses, and thus do not have the function of controlling the feeding power. In the power receiving unit 50, the voltage-doubler rectifier circuit 32 is provided, which makes it possible to receive the supply of the electric power from such many electronic apparatuses. In this way, in the power receiving unit 50, it is possible to receive the supply of the electric power from many electronic apparatuses, which makes it possible to increase the convenience to the user.

In addition, in the power receiving unit 50, two rectifier circuits (the voltage-doubler rectifier circuit 32 and the synchronous rectifier circuit 34) are provided. Hence, for example, in a case where a position of the wearable apparatus 9 is located at a desirable position on the smartphone 7, it is possible to select the synchronous rectifier circuit 34 having high efficiency, and in a case where the position of the wearable apparatus 9 is misaligned from the desirable position, it is possible to select the voltage-doubler rectifier circuit 32 that has an ability to raise the voltage Vrect. As a result, even when the position of the wearable apparatus 8 is misaligned, it is possible to charge the secondary battery 36, which makes it possible to increase the convenience to the user.

As described above, in the present embodiment, since the voltage-doubler rectifier circuit is provided, it is possible to receive the supply of the electric power from various electronic apparatuses available on the market, which makes it possible to increase the convenience to the user.

In the present embodiment, since two rectifier circuits are provided, it is possible to charge the secondary battery, even though the position of the power receiving unit is misaligned. This makes it possible to increase the convenience to the user.

[Modification Example 2-1]

In the above-described embodiment, the voltage-doubler rectifier circuit 32 operates when the feeding operation begins, but this is not limitative. Instead of this, for example, the synchronous rectifier circuit 34 may operate when the feeding operation begins, as illustrated in FIG. 11. In this example, a power-receiving controller 60A according to the present modification example selects the synchronous rectifier circuit 34 (step S45). Thereafter, the feed unit 10 starts the feeding operation (step S36).

[Modification Example 2-2]

In the above-described embodiment, the power-receiving controller 60 selects the rectifier circuit to be used, on the basis of the voltage Vrect, but this is not limitative. For example, as with a power-receiving controller 60B of a power receiving unit 50B illustrated in FIG. 12, the rectifier circuit to be used may be selected, on the basis of amplitude of a signal at the one end of the coil 21. Specifically, for example, in a case where an amplitude value of the signal at the one end of the coil 21 is greater than a predetermined value, the power-receiving controller 60B may select the synchronous rectifier circuit 34, and in a case where the amplitude value of the signal at the one end of the coil 21 is equal to or less than the predetermined value, the power-receiving controller 60B may select the voltage-doubler rectifier circuit 32.

It is to be noted that, in this example, the rectifier circuit to be used is selected on the basis of the amplitude of the signal at the one end of the coil 21, but this is not limitative. Instead of this, for example, the rectifier circuit to be used may be selected, on the basis of amplitude of a signal at the other end of the coil 21, or the rectifier circuit to be used may be selected, on the basis of amplitude of a signal between both ends of the coil 21.

[Modification Example 2-3]

In the above-described embodiment, the power receiving unit 50 receives the electric power from the feed unit 10 that does not have the function of controlling the feeding power, but this is not limitative. For example, it may be possible to receive the electric power also from the feed unit having the function of controlling the feeding power, by combining the above-described first embodiment (FIG. 7) and the above-described second embodiment (FIG. 10). Specifically, step S11 to step S13 in the flowchart illustrated in FIG. 7 according to the above-described first embodiment may be replaced with step S35 to step S40 in the flowchart illustrated in FIG. 10.

The technology has been described using some embodiments and modification examples as well as examples applied to electronic apparatuses, but the technology is not limited thereto, and various modifications may be made.

For example, in the above-described embodiments, the feed unit 10 is applied to the smartphone, but is not limited thereto, and applicable to various electronic apparatuses each having the function of performing the near-field wireless communication. Similarly, in the above-described embodiments, the power receiving units 20 and 50 are each applied to the watch-type wearable apparatus, but are not limited thereto, and applicable to various electronic apparatuses each having the function of performing the near-field wireless communication.

It is to be noted that the effects described herein are mere examples without being limitative, and other effects may also be provided.

It is to be noted that the technology may adopt the following configurations.

(1) A power receiving unit including:
a communicator that communicates with a feed unit;
a power receiver that has a first rectifier circuit and a second rectifier circuit that each rectify an electric power signal supplied from the feed unit; and
a controller that selects and operates one of the first rectifier circuit and the second rectifier circuit.

(2) The power receiving unit according to (1), in which the first rectifier circuit boosts the electric power signal while performing rectification.

(3) The power receiving unit according to (2), in which the first rectifier circuit is a voltage-doubler rectifier circuit.

(4) The power receiving unit according to (2) or (3), in which the second rectifier circuit is a synchronous rectifier circuit.

(5) The power receiving unit according to any one of (2) to (4), in which
the communicator receives feeding information indicating performance of the feed unit, and
the controller selects one of the first rectifier circuit and the second rectifier circuit, on a basis of the feeding information.

(6) The power receiving unit according to (5), in which the feeding information includes information indicating whether the feed unit has a function of controlling feeding power.

(7) The power receiving unit according to (6), in which, the controller selects the first rectifier circuit in a case where the feed unit does not have the function of controlling the feeding power, and selects the second rectifier circuit in a case where the feed unit has the function of controlling the feeding power.

(8) The power receiving unit according to (5), in which the feeding information includes information indicating a feeding capability of the feed unit.

(9) The power receiving unit according to (8), in which the controller selects the first rectifier circuit in a case where the feed unit does not have a predetermined feeding capability, and selects the second rectifier circuit in a case where the feed unit has the predetermined feeding capability.

(10) The power receiving unit according to any one of (2) to (4), in which the controller selects one of the first rectifier circuit and the second rectifier circuit, on a basis of a receiving voltage.

(11) The power receiving unit according to (10), in which the controller selects the first rectifier circuit in a case where the receiving voltage is lower than a predetermined voltage, and selects the second rectifier circuit in a case where the receiving voltage is higher than the predetermined voltage.

(12) The power receiving unit according to (10) or (11), in which the receiving voltage is an output voltage of the one selected from the first rectifier circuit and the second rectifier circuit.

(13) The power receiving unit according to (10) or (11), in which
the power receiver receives the electric power signal through a coil, and
the receiving voltage is a voltage in the coil.

(14) The power receiving unit according to any one of (1) to (13), in which the communicator communicates by near-field wireless communication.

(15) The power receiving unit according to any one of (1) to (14), in which the power receiver receives the electric power signal through a coil, and the communicator communicates with the feed unit through the coil.

(16) A power receiving method including:

communicating with a feed unit; and selecting one of a first rectifier circuit and a second rectifier circuit that each rectify an electric power signal supplied from the feed unit.

(17) A feed system including:

a feed unit; and a power receiving unit, the power receiving unit including a communicator that communicates with the feed unit, a power receiver that has a first rectifier circuit and a second rectifier circuit that each rectify an electric power signal supplied from the feed unit, and a controller that selects and operates one of the first rectifier circuit and the second rectifier circuit.

This application is based upon and claims the benefit of priority of the Japanese Patent Application No. 2015-83178 filed with the Japan Patent Office on Apr. 15, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power receiving unit, comprising:
   a communicator configured to communicate with a feed unit;
   a power receiver that has a first rectifier circuit and a second rectifier circuit, wherein each of the first rectifier circuit and the second rectifier circuit is configured to rectify an electric power signal supplied from the feed unit; and
   a controller configured to select and operate one of the first rectifier circuit or the second rectifier circuit.

2. The power receiving unit according to claim 1, wherein the first rectifier circuit is further configured to boost the electric power signal during the rectification.

3. The power receiving unit according to claim 2, wherein the first rectifier circuit is a voltage-doubler rectifier circuit.

4. The power receiving unit according to claim 2, wherein the second rectifier circuit is a synchronous rectifier circuit.

5. The power receiving unit according to claim 2, wherein
   the communicator is further configured to receive feeding information indicating performance of the feed unit, and
   the controller is further configured to select one of the first rectifier circuit or the second rectifier circuit, based on the feeding information.

6. The power receiving unit according to claim 5, wherein the feeding information includes information indicating whether the feed unit has a function of controlling feeding power.

7. The power receiving unit according to claim 6, wherein the controller is further configured to:
   select the first rectifier circuit in a case where the feed unit does not have the function of controlling the feeding power, and
   select the second rectifier circuit in a case where the feed unit has the function of controlling the feeding power.

8. The power receiving unit according to claim 5, wherein the feeding information includes information indicating a feeding capability of the feed unit.

9. The power receiving unit according to claim 8, wherein the controller is further configured to:
   select the first rectifier circuit in a case where the feed unit does not have a predetermined feeding capability, and
   select the second rectifier circuit in a case where the feed unit has the predetermined feeding capability.

10. The power receiving unit according to claim 2, wherein the controller is further configured to select one of the first rectifier circuit or the second rectifier circuit, based on a receiving voltage.

11. The power receiving unit according to claim 10, wherein the controller is further configured to:
    select the first rectifier circuit in a case where the receiving voltage is lower than a predetermined voltage, and
    select the second rectifier circuit in a case where the receiving voltage is higher than the predetermined voltage.

12. The power receiving unit according to claim 10, wherein the receiving voltage is an output voltage of the selected one of the first rectifier circuit or the second rectifier circuit.

13. The power receiving unit according to claim 10, wherein
    the power receiver is further configured to receive the electric power signal through a coil, and
    the receiving voltage is a voltage in the coil.

14. The power receiving unit according to claim 1, wherein the communicator is further configured to communicate by near-field wireless communication.

15. The power receiving unit according to claim 1, wherein the power receiver is further configured to receive the electric power signal through a coil, and the communicator is further configured to communicate with the feed unit through the coil.

16. A power receiving method comprising:
    communicating with a feed unit; and
    selecting one of a first rectifier circuit or a second rectifier circuit, wherein each of the first rectifier circuit and the second rectifier circuit is configured to rectify an electric power signal supplied from the feed unit.

17. A feed system, comprising:
    a feed unit; and
    a power receiving unit,
    the power receiving unit including:
      a communicator configured to communicate with the feed unit;
      a power receiver that has a first rectifier circuit and a second rectifier circuit, wherein each of the first rectifier circuit and the second rectifier circuit is configured to rectify an electric power signal supplied from the feed unit; and
      a controller configured to select and operate one of the first rectifier circuit or the second rectifier circuit.

* * * * *